United States Patent
Cleaver et al.

(10) Patent No.: US 10,318,524 B2
(45) Date of Patent: Jun. 11, 2019

(54) REPORTING AND DATA GOVERNANCE MANAGEMENT

(71) Applicant: Accenture Global Solutions Limited, Dublin (IE)

(72) Inventors: Melinda Jo Cleaver, Vancouver, WA (US); Ryan Alan J. Boone, Madison, WI (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/813,664

(22) Filed: Nov. 15, 2017

(65) Prior Publication Data

US 2019/0147082 A1    May 16, 2019

(51) Int. Cl.
*G06F 16/28* (2019.01)
*G06F 16/242* (2019.01)
*G06F 16/245* (2019.01)
*G06F 16/248* (2019.01)

(52) U.S. Cl.
CPC .......... *G06F 16/242* (2019.01); *G06F 16/245* (2019.01); *G06F 16/248* (2019.01); *G06F 16/284* (2019.01)

(58) Field of Classification Search
CPC ............. G06F 17/30389; G06F 16/242; G06F 16/245; G06F 16/248; G06F 16/284
See application file for complete search history.

(56) References Cited

U.S. PATENT DOCUMENTS

| | | |
|---|---|---|
| 5,386,556 A | 1/1995 | Hedin et al. |
| 6,463,441 B1 | 10/2002 | Paradies |
| 6,484,149 B1 | 11/2002 | Jammes |
| 7,783,657 B2 | 8/2010 | Fox et al. |
| 9,489,418 B2 | 11/2016 | Brodsky et al. |
| 2004/0193567 A1 | 9/2004 | Dettinger et al. |

(Continued)

FOREIGN PATENT DOCUMENTS

| | | |
|---|---|---|
| WO | 97/45800 | 12/1994 |
| WO | 2016/106242 | 6/2016 |

OTHER PUBLICATIONS

European Search Report in European Application No. 18205534.3, dated Jan. 29, 2019, 9 pages.

(Continued)

*Primary Examiner* — Cam Y T Truong
(74) *Attorney, Agent, or Firm* — Fish & Richardson P.C.

(57) ABSTRACT

Methods, systems, and apparatus, including computer programs encoded on a computer storage medium, for generating database queries, including receiving an asset template, the asset template associated with an enterprise context and one or more enterprise terms; identifying respective mappings of the one or more enterprise terms to one or more database tables; compiling the asset template based on the mappings to provide a database query; providing for display the database query; verifying the database query based on the displaying; receiving, in response to the verifying, an approval signal associated with the database query; storing the database query; querying a different database utilizing the database query; and in response to the querying, identifying data stored by the different database that is responsive to the database query.

16 Claims, 15 Drawing Sheets

(56) References Cited

U.S. PATENT DOCUMENTS

| | | | |
|---|---|---|---|
| 2005/0149907 A1* | 7/2005 | Seitz | G06F 9/5016 |
| | | | 717/108 |
| 2005/0222987 A1* | 10/2005 | Vadon | G06F 17/30864 |
| 2006/0161556 A1 | 7/2006 | Detteringer et al. | |
| 2008/0120286 A1 | 5/2008 | Dettinger | |
| 2011/0040745 A1* | 2/2011 | Zaydman | G06F 17/30595 |
| | | | 707/714 |
| 2013/0191723 A1 | 7/2013 | Pappas | |
| 2014/0280259 A1 | 9/2014 | McGillin et al. | |
| 2015/0019488 A1 | 1/2015 | Higginson | |
| 2015/0186551 A1* | 7/2015 | Badimon | G06F 17/30976 |
| | | | 707/722 |
| 2016/0147637 A1* | 5/2016 | Bhagavan | G06F 17/30424 |
| | | | 717/127 |
| 2016/0179930 A1 | 6/2016 | Radivojevic | |
| 2016/0224621 A1 | 8/2016 | Bousquet et al. | |
| 2017/0097940 A1* | 4/2017 | Panuganty | G06F 17/3097 |
| 2017/0262501 A1 | 9/2017 | Namboodiri et al. | |

OTHER PUBLICATIONS

European Search Report in European Application No. 18202751.6, dated Jan. 15, 2019, 9 pages.
MongoBDManager.com [online], "No SQL manager—gui tool with intelligent shell certified by MongoDB" Jul. 22, 2017, [retrieved on Dec. 20, 2018], retrieved from : URL: https://web.archive.org/web/20170722174050/https://www.mongobdmanager.com.
USPTO Office Action in U.S. Appl. No. 15/813,727, dated Oct. 29, 2018, 38 pages.

* cited by examiner

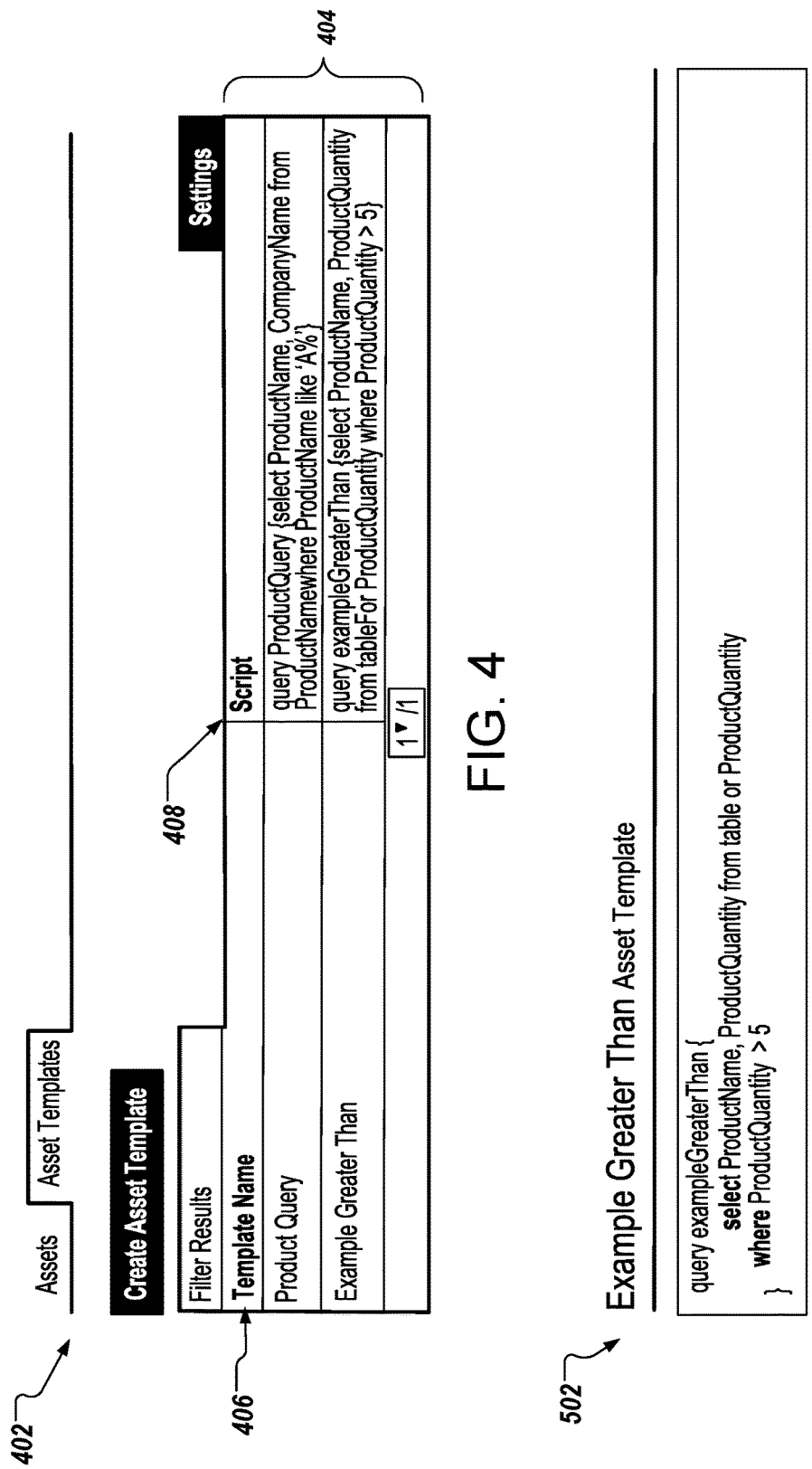

Create new asset template

Name

Product Query ← 604

```
1 query ProductQuery {
2    select ProductName, CompanyName from ProductName
3    where ProductName like 'A%' }
```
← 602

✓ Save  Reset Form  ✗ Cancel Creation

Edit Asset Template

Name

Product Query ← 704

Script

```
1 query ProductQuery {
2    select ProductName, CompanyName from ProductName
3    where ProductName like 'A%' }
```
← 702

✓ Save  Reset Form

REPORTING AND DATA GOVERNANCE MANAGEMENT

CROSS-REFERENCE TO RELATED APPLICATIONS

The application is related to and filed in conjunction with U.S. patent application Ser. No. 15/813,727, filed Nov. 15, 2017, entitled "REPORTING AND DATA GOVERNANCE MANAGEMENT", the entire contents of the application are hereby incorporated by reference.

BACKGROUND

This application is related creating the reporting assets, managing the creation of the reporting asserts, managing enterprise terms (and associated database tables and columns), and further provides connections between such for discovery of the reporting assets.

SUMMARY

Implementations of the present disclosure are generally directed to a method for generating database queries, including receiving an asset template, the asset template associated with an enterprise context and one or more enterprise terms; identifying respective mappings of the one or more enterprise terms to one or more database tables; compiling the asset template based on the mappings to provide a database query; providing for display the database query; verifying the database query based on the displaying; receiving, in response to the verifying, an approval signal associated with the database query; storing the database query; querying a different database utilizing the database query; and in response to the querying, identifying data stored by the different database that is responsive to the database query.

Other embodiments of these aspects include corresponding systems, apparatus, and computer programs, configured to perform the actions of the methods, encoded on computer storage devices.

These and other embodiments may each optionally include one or more of the following features. For instance, the database query is a relational database query. The relational database query is a SQL query. The database query is a NoSQL query. The one or more enterprise terms are associated with one or more of a formula value, a scalar value, and a dynamic value. The features further include method steps including compiling the asset template based on i) the enterprise context and the ii) one or more of the formula value, scalar value, and dynamic value that is associated with the one or more enterprise terms. After receiving the approval signal, creating an asset based on the database query, the asset including searchable metadata for identifying the asset.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

Particular implementations of the subject matter described in this specification can be implemented so as to realize one or more of the following advantages. For example, workflows, technology innovations, and unique processes can be leveraged by organization to better manage the reporting and data governance processes, including improving the process of writing database queries. Specifically, such improvements including making simple queries faster and easier to write that can be reused on multiple databases (without writing for a particular row or column). Furthermore, integration is facilitated into existing workflows and communication processes. Additionally, inventory management facilitates the creation of report libraries, including making such more useful and automation of the creation of the same.

BRIEF DESCRIPTION OF DRAWINGS

FIG. 4 depicts an asset template interface.

FIG. 5 depicts a database query module interface.

FIG. 6 depicts an asset template creation interface.

FIG. 7 depicts an asset template edit interface.

DETAILED DESCRIPTION

This application is related to a reporting lifecycle and data governance management system for streamlining computer-implemented processes, such as the processes of creating, maintaining, and searching for reporting assets and enterprise terms. The management system allows the forecasting, budgeting, and monetization of such assets as well. Specifically, the management system provides tools for creating the reporting assets, managing the creation of the reporting asserts, managing enterprise terms (and associated database tables and columns), and further provides connections between such for discovery of the reporting assets.

Figure 1:
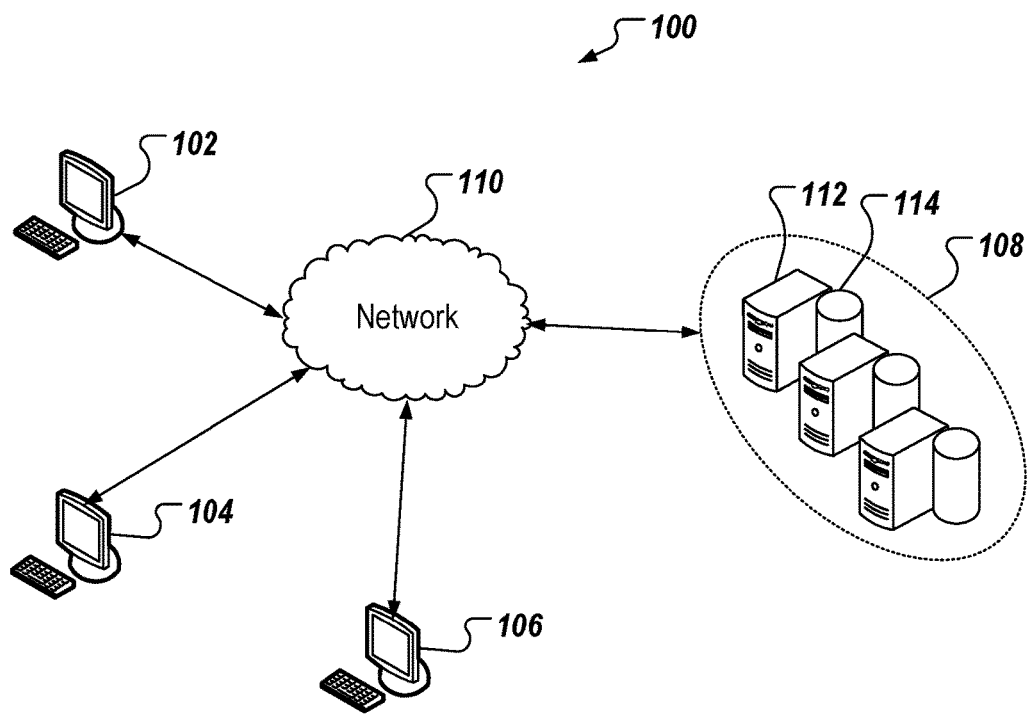
FIG. 1 depicts an example high-level architecture in accordance with implementations of the present disclosure.

FIG. 1 depicts an example system 100 that can execute implementations of the present disclosure. The example system 100 includes computing devices 102, 104, 106, a back-end system 108, and a network 110. In some implementations, the network 110 includes a local area network (LAN), wide area network (WAN), the Internet, or a combination thereof, and connects web sites, devices (e.g., the computing device 102, 104, 106), and back-end systems (e.g., the back-end system 108). In some implementations, the network 110 can be accessed over a wired and/or a wireless communications link. For example, mobile computing devices, such as smartphones, can utilize a cellular network to access the network 110.

In the depicted example, the back-end system 108 includes at least one server system 112, and data store 114 (e.g., database). In some implementations, at least one server system 112 hosts one or more computer-implemented services that users can interact with using computing devices. For example, the server system 112 can host the reporting lifecycle and data governance management system in accordance with implementations of the present disclosure. In some implementations, the back-end system 108 represents computer systems utilizing clustered computers and components to act as a single pool of seamless resources when accessed through a network. For example, such implementations may be used in data center, cloud computing, storage area network (SAN), and network attached storage (NAS) applications. In some implementations, back-end system 108 represents a virtual machine.

In some implementations, the computing devices 102, 104, 106 can each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

Figure 2:
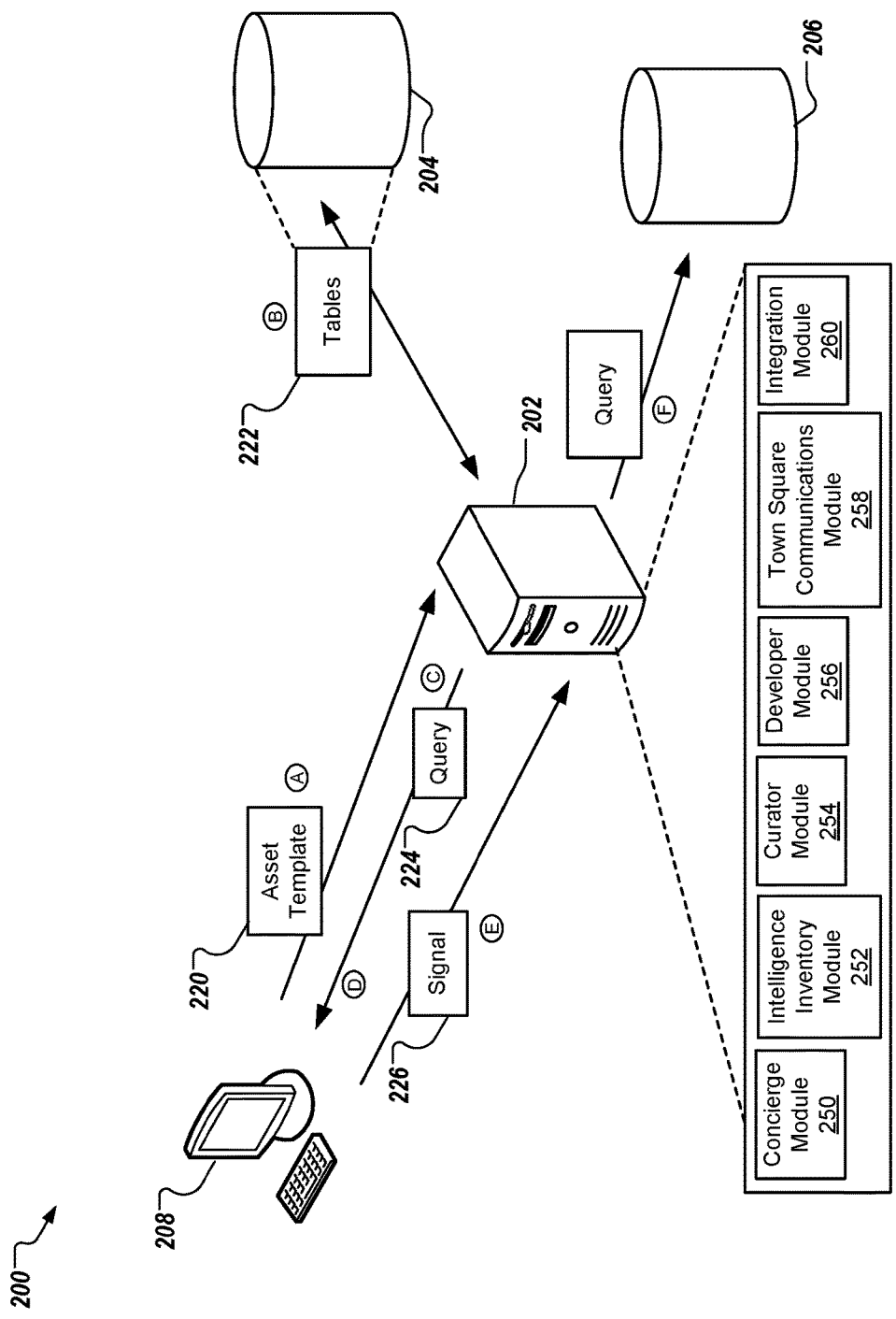
FIG. 2 depicts a system for generation of database queries.

A particular implementation of the system 100 is shown in FIG. 2 as system 200—a system for the generation of database queries. The system 200 (e.g., the reporting lifecycle and data governance management system) includes a server system 202, databases 204, 206, and a computing device 208. The server system 202 can be in communication with the databases 204, 206 (e.g., over a network); and further can be in communication with the computing device 208 (e.g., over the network). In short, the system 200 facilitates the creation of queries (e.g., human-readable technical database queries) against diverse data sets utilizing enterprise terms. In some examples, the system 200 utilizes asset templates to store generic queries or platform specific queries. In some examples, the system 200 can build different queries based on a context provided to the system 200. For example, a first context can describe an ERP (Enterprise Resource Planning) system and a second context can describe an EMR (Electronic Medical Record) system. The system 200 facilitates creation of one query that can be compiled into two different queries that are each dependent on the appropriate context.

The system includes a Concierge module 250, an Intelligence Inventory Module 252, a Curator Module 254, a Developer Module 256, a Town Square Communications Module 258, and an Integration Module 260. The Concierge module 250 provides management of requests. The Intelligence Inventory module 252 provides management of reporting assets, including creation of generic reporting assets that can be utilized with other databases. The Curator module 254 provides data governance and enterprise term management. The Developer module 256 provides management of reporting projects. The Town Square communications module 258 provides forum (social) functionality.

In some implementations, the server system 202 receives an asset template 220 at step A. In some examples, the asset template 220 is associated with an enterprise context and one or more enterprise terms. That is, the server system 202 can parse and tokenize the asset template 220 to identify the enterprise context and the enterprise terms of the asset template 220. In some examples, an enterprise term is a definition and location of data for an organization. In some examples, an enterprise context determines a data location for an enterprise term.

In some examples, the enterprise terms are associated with one or more of a formula value, a scalar value, and a dynamic value. In some examples, an enterprise term can be expanded by the server system 202 into a formula. For example, in a first context, "Full Name" is a column in a database that contains a full name of a user, however, in a second context, such a column does not exist. Thus, a context-based term is created that is a formula, e.g., Full Name=employee.FirstName+employee.LastName. In some examples, the user providing the data of the asset template 220 provides the enterprise terms, the enterprise context, and the whether the enterprise terms define a formula value, a scalar value, or a dynamic value. In some examples, the user selects the enterprise context from a list of provided enterprise contexts.

The server system 202 identifies respective mappings of the enterprise terms to database tables 222 stored by the database 204 at step B. For example, the server system 202, e.g., the Curator module 254, identifies the enterprise terms, and when a match is found by the Curator module 254, the server system 202 then searches the database tables 222 based on the enterprise context of the asset template 220. In some examples, the database tables 222 can include one or more database tables—i) an enterprise term database table that stores the mnemonics for searching of enterprise terms; ii) an enterprise term context database table that stores specific database tables and columns for enterprise terms and context; and iii) an asset template database table that stores corresponding database queries and asset templates.

The server system 202 compiles the asset template 220 based on the mappings to provide a database query 224 at step C. For example, the server system 202 creates the database query 224 based on the mappings of enterprise terms to the database tables 222, for example, within the curator module 306. In some examples, the server system 202 adds relational database (e.g., Structured Query Language (SQL)) syntax to the database query 224. In some examples, the database query 224 is a relational database query (e.g., SQL query). In some examples, the database query 224 is a non-relational database query (e.g., NoSQL query). In some examples, the server system 202 can compile the asset template 220 based on the enterprise context and the whether the enterprise terms define a formula value, a scalar value, or a dynamic value.

The server system 202 provides the database query 224 to the computing device 208 for display for verification of the database query 224 at step D. Specifically, the database query 224 is provided to the user for verification of an accuracy of the database query 224. That is, the user can verify that the database query 224 is accurate/correct. Once the database query 224 is approved, the computing device 208 provides an approval signal 226 that is received by the server system 202 at step E. The approval signal 226 is associated with the database query 224 indicating whether the database query 224 is accurate or inaccurate.

In response to the approval signal 226 indicating that the database query 224 is accurate, the database query 224 is stored in the database 206 at step F. In some examples, in response to the server system 202 receiving the approval signal 226, the server system 202 can additionally create an asset based on the database query 224 that is stored by the database 206. The asset can include searchable metadata for identifying the asset, for example, in response to a further query for assets.

After providing the database query 224, the computing device 208 can utilize the database query 224 for querying a different database. For example, the computing device 208 can query a SQL database utilizing the database query 224. To that end, in response to such querying, the computing device 208 can identify data stored by the different database that is responsive to the database query 224. In some examples, the different database can include heterogeneous databases, i.e., databases having a different configuration.

In some implementations, the Developer module 256 provides management of projects used by end users—for example, to manage deliverables, priority, tools, events, and tasks for the deliverables. The Town Square communications module 258 provides a forum system that integrates with the other modules where reporting teams can discuss different assets, queries, and enterprise terms as well as provide a means to track institutional knowledge.

In some implementations, the system 200 further includes an integration module 260 that provides integration with other software applications. In general, the integration module 260 utilizes a token assigned to each integrated software application with permissions associated with accessibility of the software application. The integration module 260 provides a standard message type that each software application uses for interaction with the integration module 260—the messages are used by the integration module 260 to make appropriate calls within the system 200. This minimizes sharing of internal information outside of the systems 200, and thus, reducing data communication demands as well as adding additional security and protection of the data (e.g., of the databases).

Figure 3:
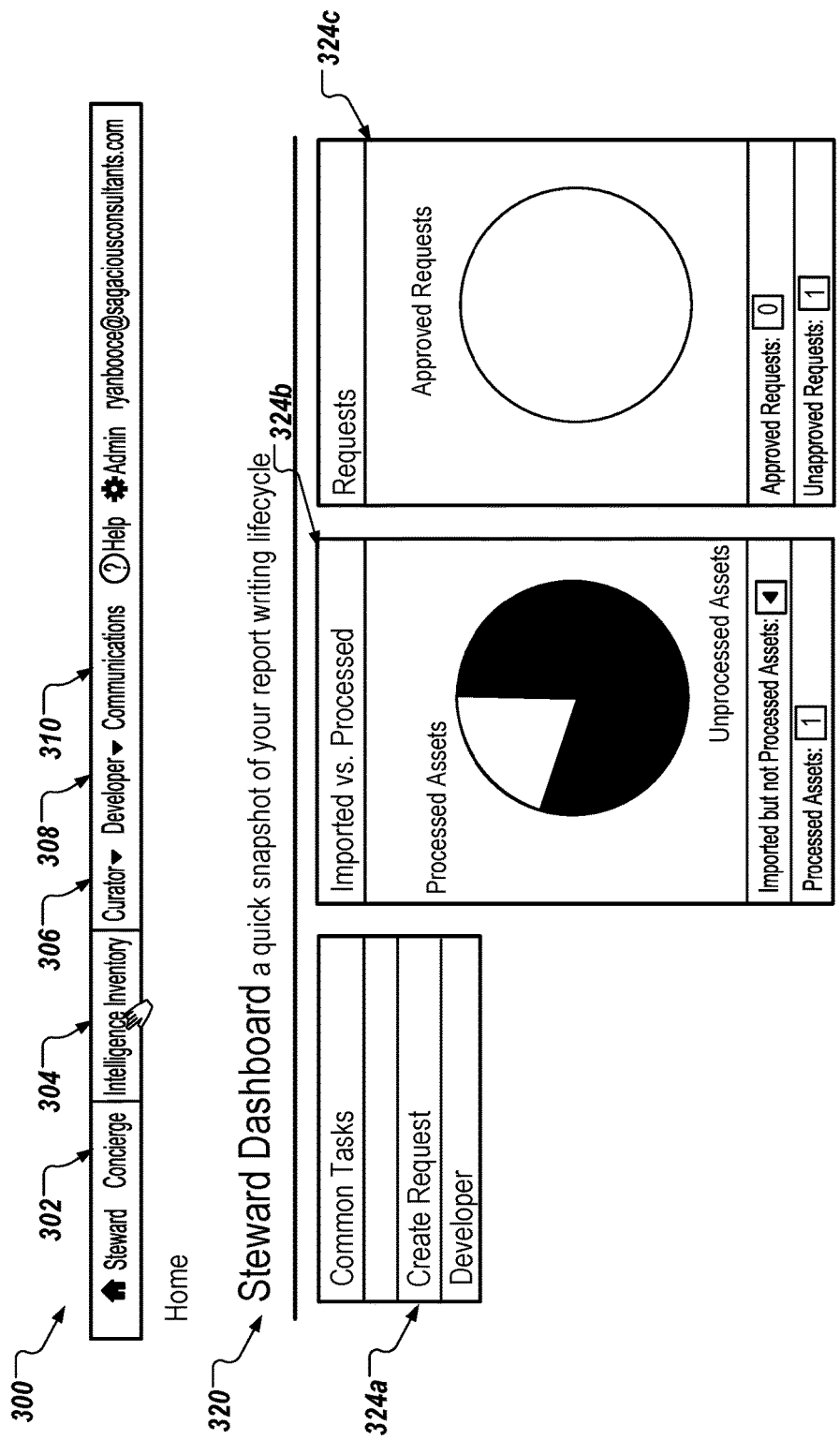
FIG. 3 depicts an application interfaces associated with a reporting lifecycle and data governance management system.

In some implementations, the server system 202 provides, to the computing device 208, a web application interface 300 that is associated with the reporting lifecycle and data governance management system, as shown in FIG. 3. Referring now to FIG. 3, the application interface 300 includes multiple modules to facilitate management of asset reporting, including discovery of such assets and queries. For example, the application interface 300 includes respective graphical representations of the Concierge module 250, the Intelligence Inventory module 252, the Curator module 254, the Developer module 256, and the Town Square communications module 258.

The application interface 300 can include a dashboard 320 that provides the display of viewable information of the report writing lifecycle. For example, dashboard 320 can be configured to display information in a format that allows a user to quickly and clearly understand information related to reporting lifecycle and data governance management system. In the illustrated example, the dashboard 320 include three interface elements 324a, 324b, 324c (collectively referred to as interface elements 324). The interface element 324a displays common tasks; the interface element 324b displays a pie chart of processed and imported assets; and interface element 324c displays a pie chart of approved and unapproved requests. However, the number of interface elements 304 can vary and the contents of the interface elements 304 can vary based on the desired requirement.

FIG. 4 illustrates an asset template interface 402 that is provided by the Intelligence Inventory module 252. The asset template interface 402 provides an interface for creating generic queries that can be reused to search for information on other databases, and further provides a means for non-experts (e.g., non-database experts) to create queries that can be used for such searching. The asset template interface 402 provides functionality to create, edit, delete, compile, and view asset templates. In the illustrated example, the asset template interface 402 includes a matrix 404 for template names 406 and queries (scripts) 408. In some examples, the matrix 404 is provided in response to a query for asset templates—for example, provided within a search box. In some examples, in response to selecting one of the queries (scripts) 408, for example, by a user, a query module 502 is provided, as shown in FIG. 5. The query module 502 provides functionalities to compile and edit the query.

In some examples, when the asset template 220 is generated using the asset template interface 402, a new asset template is created, as shown in FIG. 6, utilizing an asset template creation interface 600. The asset template creation interface 600 includes a dialog box 602 for entry of the new asset template, and a name entry field 604 for naming the new asset template. In some examples, when the asset template 220 is generated using the asset template interface 402, a previous asset template is edited, as shown in FIG. 7, utilizing an asset template edit interface 700. Similar to FIG. 6, the asset template edit interface 700 includes a dialog box 702 for editing of the asset template, and a name entry field 704 displaying the name of the asset template.

Both the asset template creation interface 600 and the asset template edit interface 700 utilize a syntax highlighting integrated development environment. Specifically, the syntax highlighting integrated development environment identifies enterprise terms that can be applied during creation of the asset templates. For example, the interfaces 600 and 700 can suggest enterprise terms for incorporation with the creation of the asset template.

Figure 8:
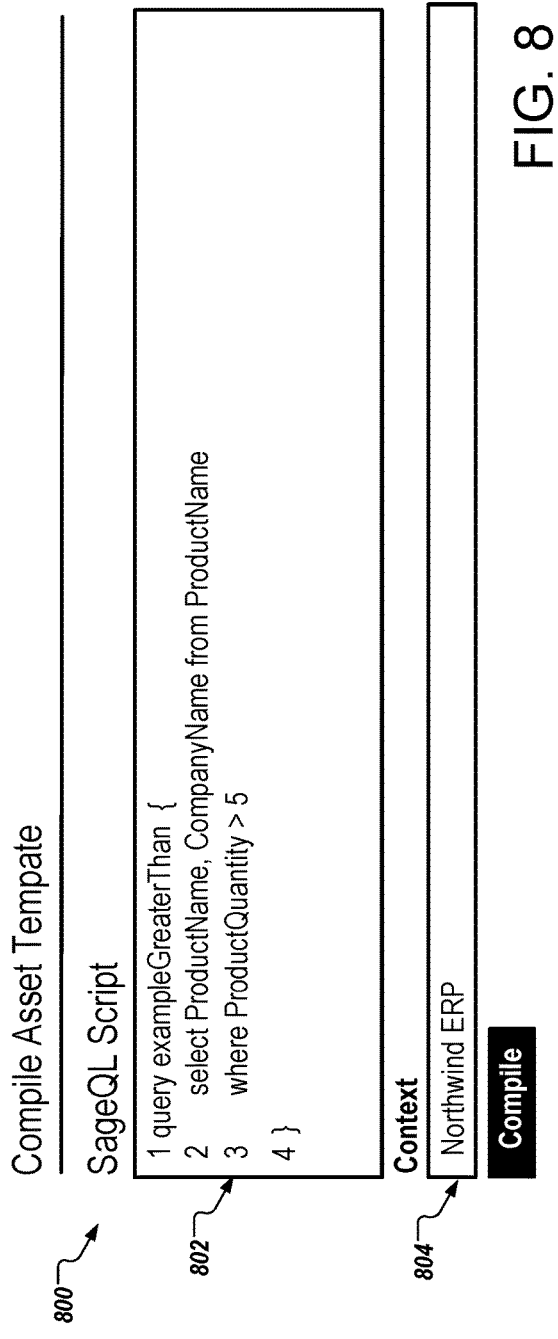
FIG. 8 depicts a compile asset template interface.
Figure 9:
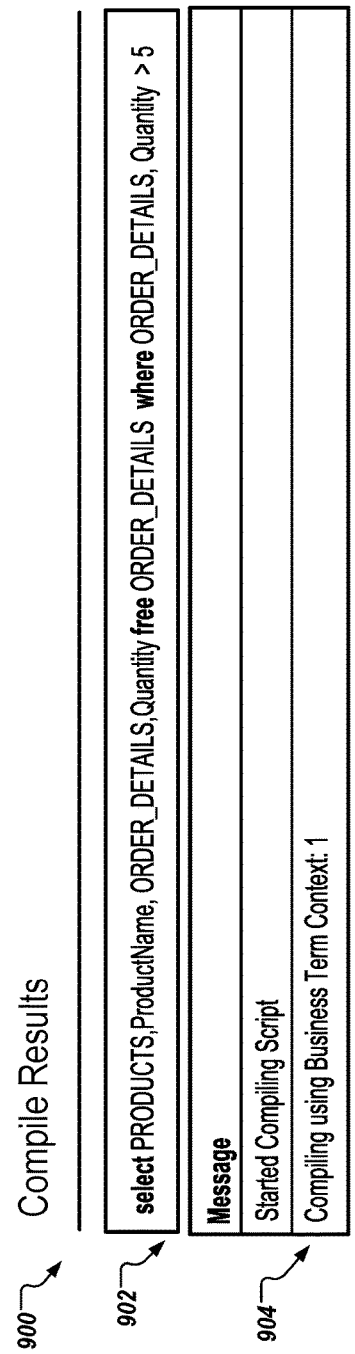
FIG. 9 depicts a results interface of a compilation.

FIG. 8 illustrates a compile asset template interface 800 (of the application interface 300). The compile asset template interface 800 provides an interface for compiling the asset template 802, including selection of an enterprise context 804. After compiling the asset template utilizing the asset template interface 800, FIG. 9 illustrates the results of compiling the asset template using a results interface 900. The results interface 900 includes a database query 902 (e.g., the database query 224 of FIG. 2), and additionally status information 904 regarding the database query 902.

Figure 10:
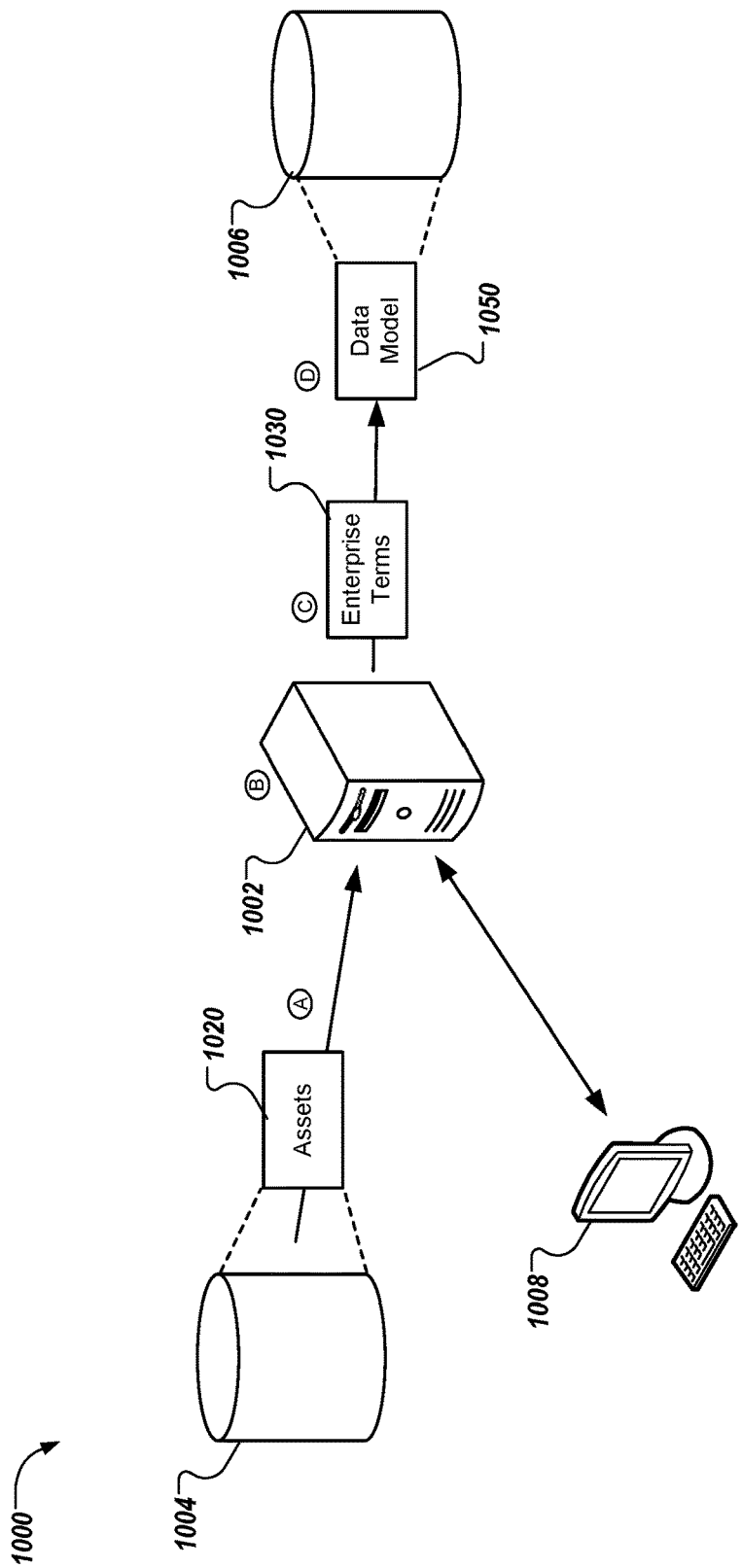
FIG. 10 depicts a system for population of a database.

FIG. 10 illustrates a further implementation of system 100—a system 1000 for population of a database. The system 1000 (e.g., the reporting lifecycle and data governance management system) includes a server system 1002, databases 1004, 1006, and a computing device 1008. The server system 1002 can be in communication with the database 1004, 1006 (e.g., over a network); and further in communication with the computing device 1008 (e.g., over the network). In short, the system 1000 implements a report and asset repository; that is, the system 1000 processes, creates, and stores metadata for assets.

The server system 1002 identifies (accesses) assets 1020 at step A. Specifically, the server system 1002 identifies the assets 1020 stored by the database 1004. In some examples, the server system 1002 identifies the assets 1020 in response to user input—for example, through the computing device 1008 in communication with the server system 1002. Each asset 1020 is associated with a database query. In some examples, at least one asset 1020 is associated with a relational database query (e.g., a SQL query). In some examples, the at least one asset 1020 is associated with a non-relational database query (e.g., NoSQL query). In some examples, at least one asset 1020 is associated with a report such as Crystal Reports from SAP SE.

The server system 1002 parses the assets 1020 to identify metadata associated with each asset at step B. Specifically, parsing of the assets 1020 can include identifying metadata such as database tables, columns, type of column (e.g., the column stores strings, numbers, dates, or is Boolean), and asset complexity of the respective assets 1020. The identified metadata can be utilized to view information about the respective assets 1020—for example, when a search of assets is conducted based on the metadata. In some examples, the metadata can be stored by a database.

In some examples, the metadata can include an identifier of a complexity of the asset 1020, a resource location of the database query associated with the asset 1020, the database tables included by the asset 1020, and the database table columns included by the asset 1020. In some examples, parsing of the assets 1020 by the server system 1002 can include identifying duplicative database tables associated with the respective assets 1020, and linking existing database tables to the respective asserts 1020.

The server system 1002 analyzes the identified metadata to identify enterprise terms 1030 at step C. For example, the server system 1002 identifies columns in a database. In some examples, the column is mapped to an enterprise term. In some examples, the column is not mapped to an enterprise term, and a matrix of columns that have yet to be mapped is provided to complete mapping of data sets. In some examples, the server system 1002 identifies potential duplicate mapping of enterprise terms to columns.

The server system 1002, in response to analyzing the identified metadata 1022, provides data models 1050 that store relationships between the assets 1020 and the metadata at step D. In some examples, the relationships can include links between the respective assets 1020 and a particular enterprise term 1030 that is determined to be associated with the respective asset 1020. In some examples, a particular asset 1020 can be linked to multiple enterprise terms 1030. In some examples, multiple particular assets 1020 can be linked to a particular enterprise term 1030.

In some implementations, the server system 1002 stores the database models 1050 in the database 1006. In some examples, the database models 1050 include multiple database models, with each database model 1050 storing differing datum of the metadata of the assets 1020. For example, a first database model 1050 can store datum related to the complexity of the asset 1050 and a second database model 1050 can store the resource location of the database query associated with the asset 1020.

In some examples, the database models 1050 can include separate database tables including i) an asset database table, ii) an asset resource table, iii) an asset validation table, iv) a database information table, v) a column database table, and vi) an asset tag database table. Specifically, the asset database table stores information for reporting assets including the description and references to other metadata; the asset resource database table stores the relational database query or resource location of the query; the asset validation table stores information of the complexity of the asset and documentation of the asset; the database information table stores information of the database tables that are included in the assets; the column database table stores information of the database table columns that are included in the assets; and the asset tag database table includes information of linkages that can be aggregated pertaining to the asset.

In some further implementations, the server system 1002 identifies an additional asset. The server system 1002 can determine that the additional asset is associated with a particular asset 1020 stored by the database 1004. For example, the server system 1002 can compare parameters of the additional asset and the particular asset 1020, including comparing metadata 1022 of the same. The server system 1002, based on the comparing, can determine that the additional asset is associated with the particular asset 1020. The sever system 1002, in response to such a determination, identifies differences between the additional asset and the particular asset 1020—for example, differences in metadata 1022. The server system 1002 updates the database 1004, and specifically, the particular asset 1020 based on the differences.

Figure 11:
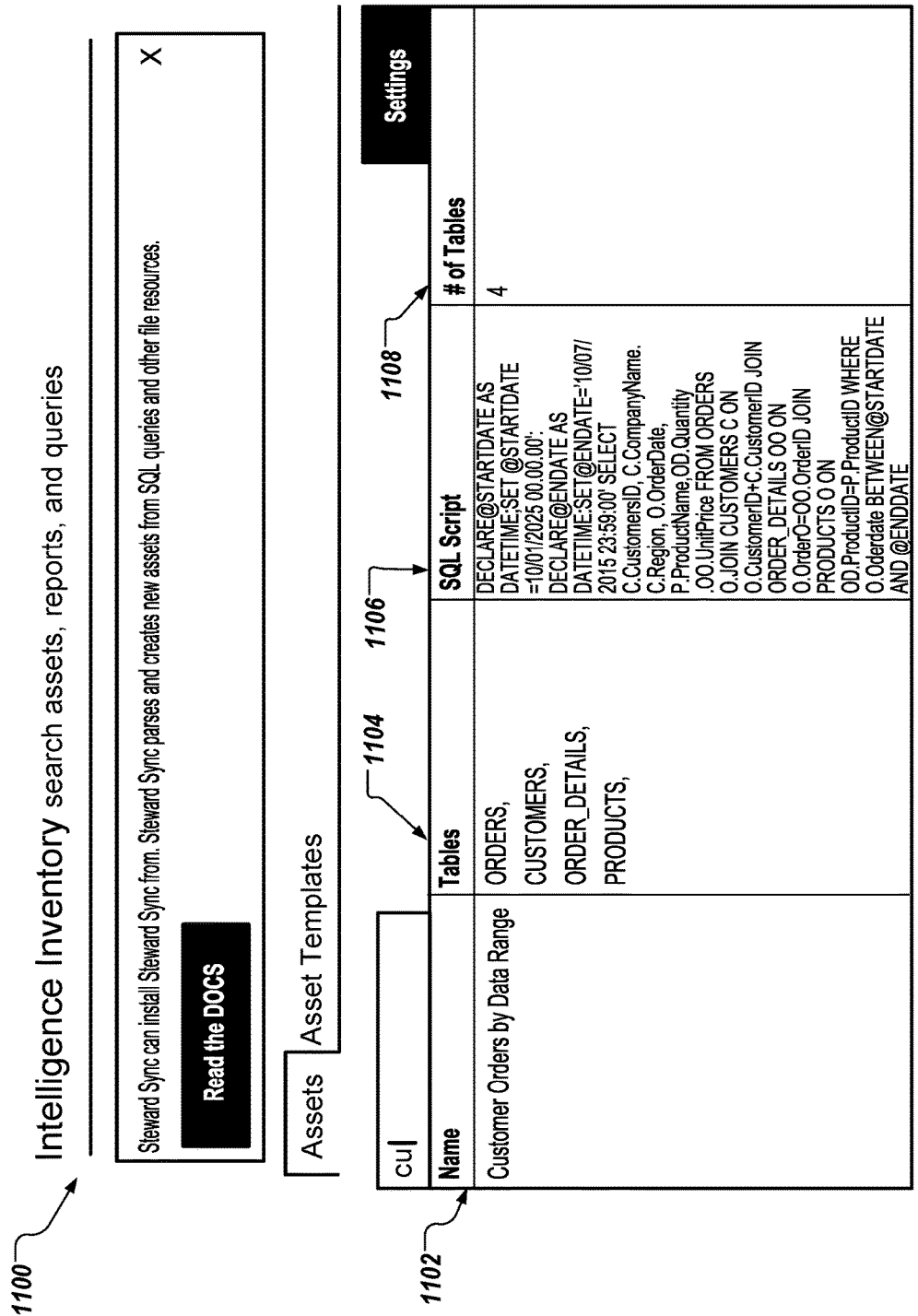
FIG. 11 depicts an intelligence inventory module interface.

Similar to server systems described above, the server system 1002 provides, to the computing device 1008, the web application interface 300, as shown in FIG. 3. In some examples, as shown in FIG. 11, the intelligence inventory module 252 provides an intelligence inventory interface 1100. The intelligence inventory interface 1100 provides management of assets, including searching functionality of asset reports and relational database queries that have been previously created. In some examples, the intelligence inventory interface 1100 can include a matrix showing relationships between assets 1102, database tables 1104 associated with the respective assets 1102, queries 1106 associated with the respective assets 1102, and a number of tables 1108 associated with the respective assets.

Referring to FIGS. 12*a*, 12*b*, 12*c*, 12*d*, an asset interface 1202 is shown, including a tabbed portion 1204 and a data portion 1206. The tabbed portion 1204 includes a description tab 1208, a properties tab 1210, a relational database query (script) tab 1212, and a diagram tab 1214. The data portion 1206 provides data that is relevant to the selected tab. In short, the asset interface 1202 provides details about a selected asset 1220 as provided by the intelligence inventory module 304 (of FIG. 3).

Figure 12A:
FIGS. 12*a*-12*d* depict an asset interface.
Figure 12B:
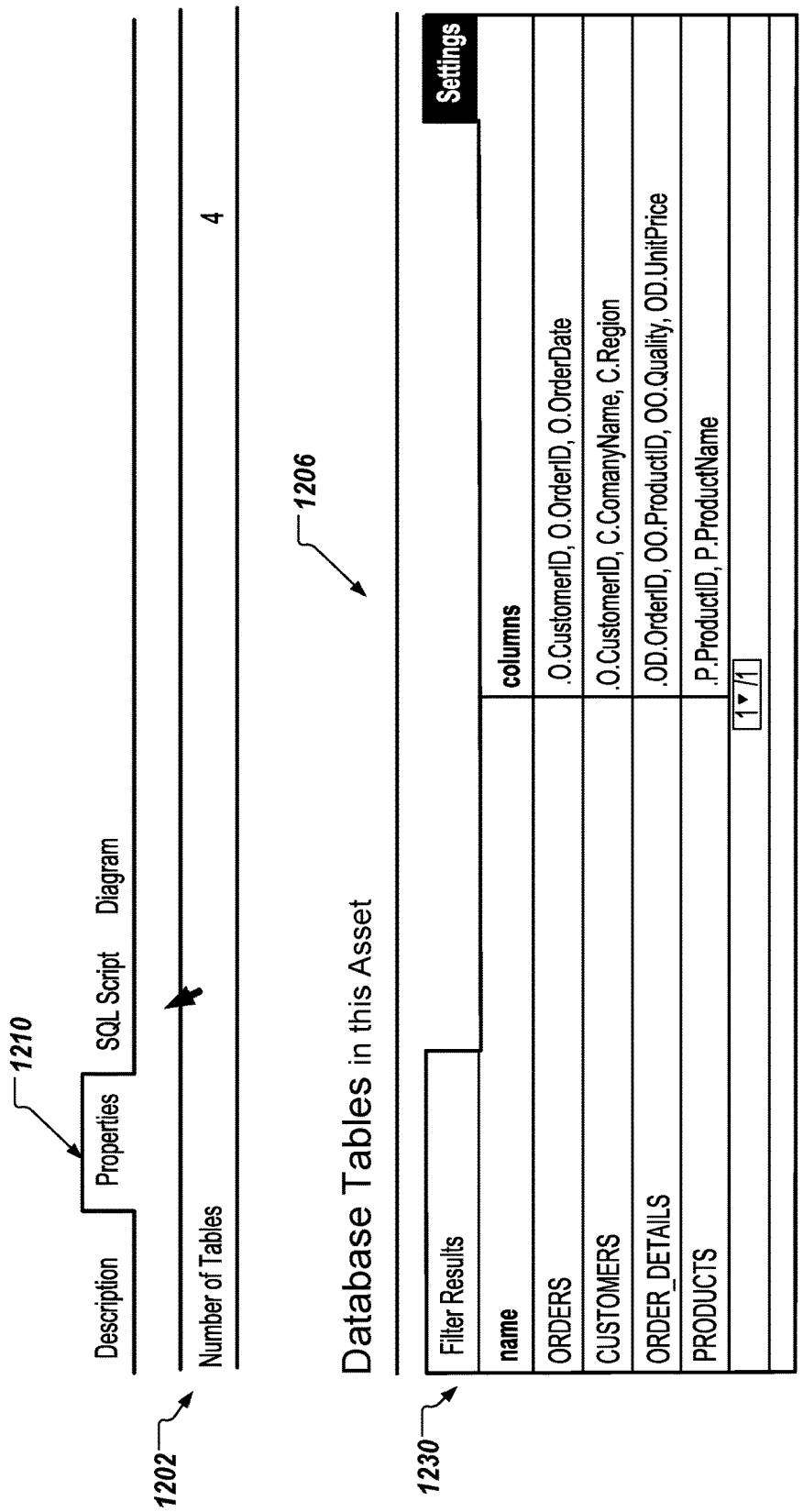
Figure 12C:
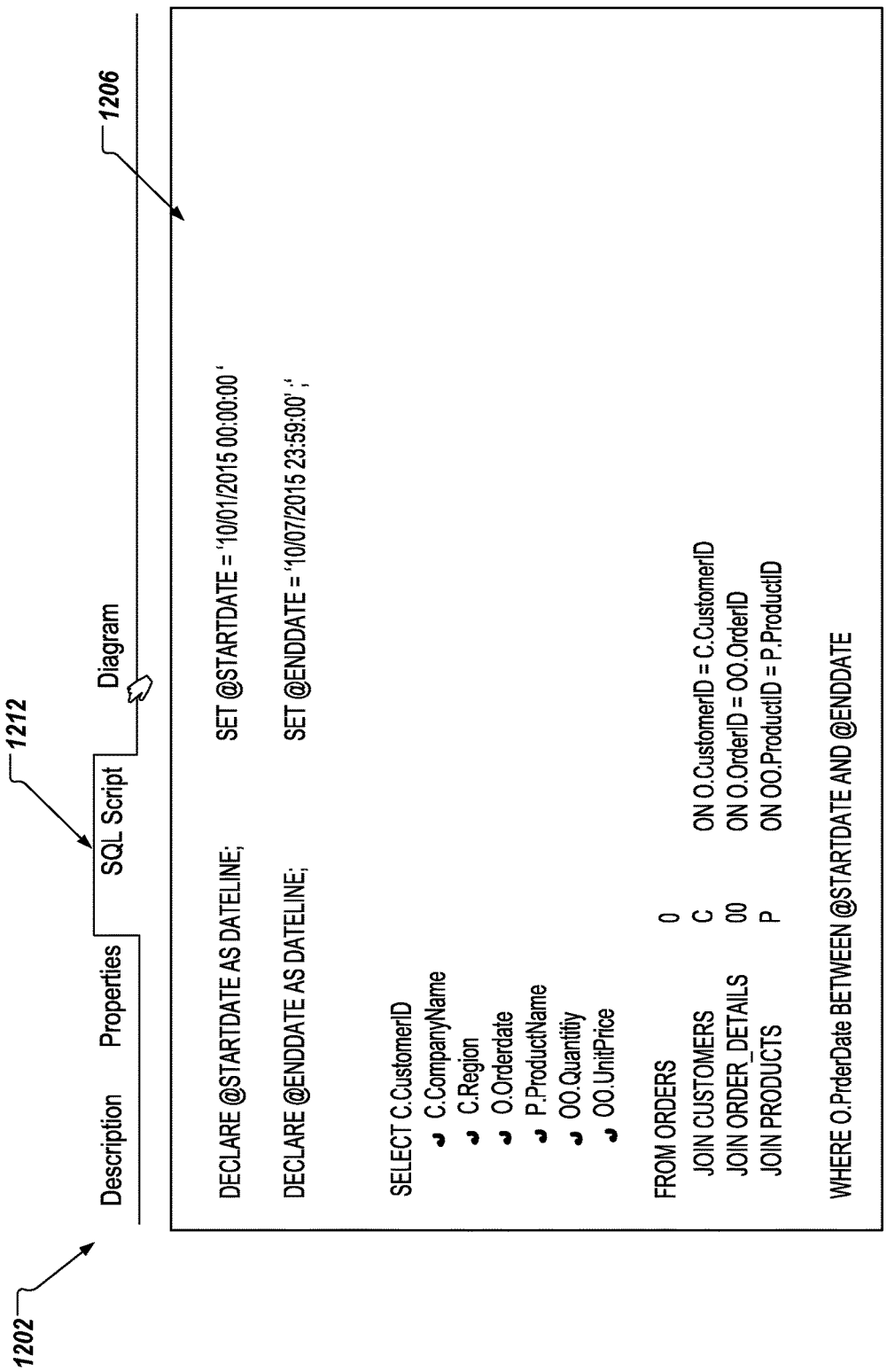
Figure 12D:
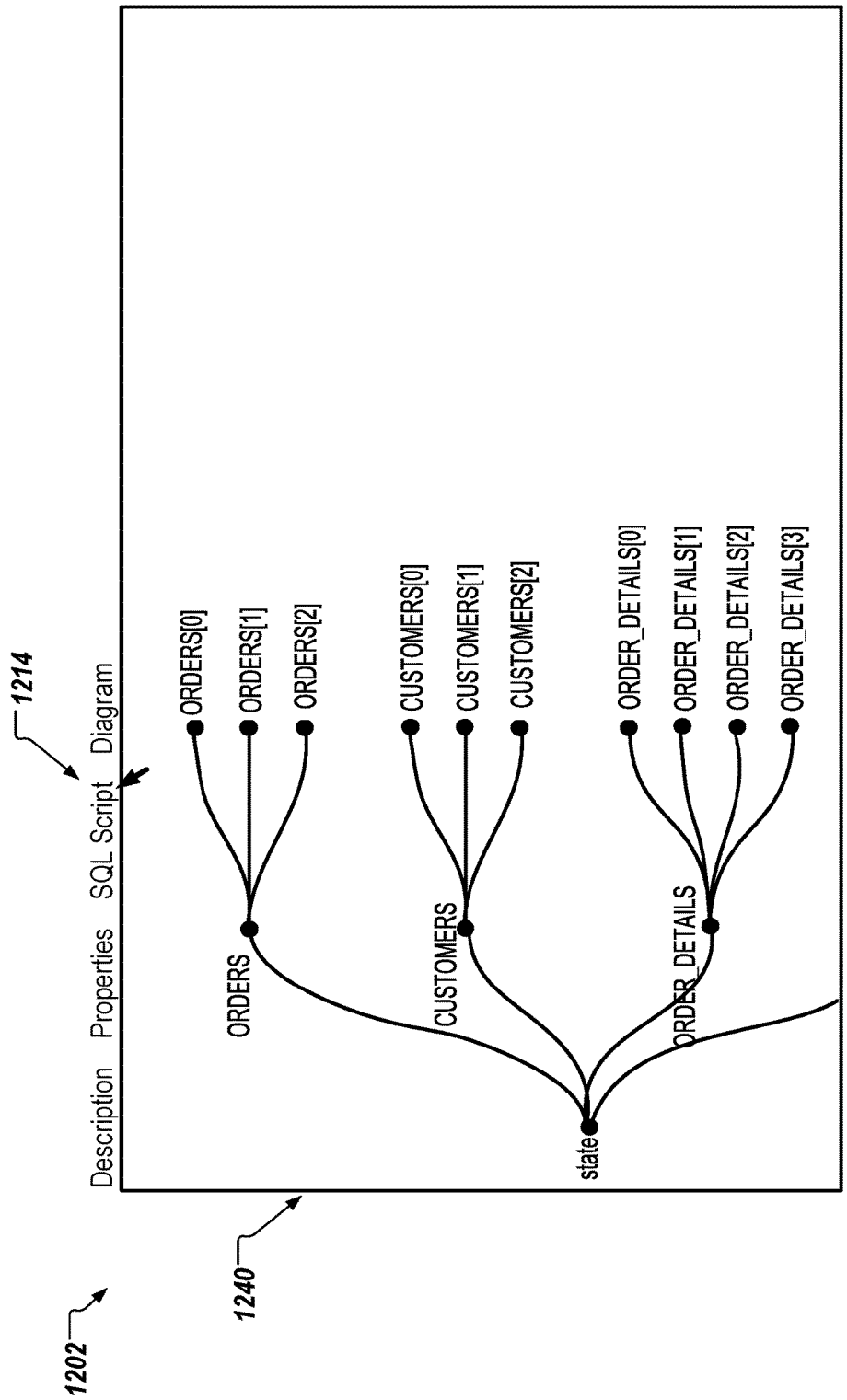

Referring to FIG. 12*a*, the asset interface 1202 is shown with the description tab 1208 selected. The data portion 1206 is updated to include information of the selected asset 1220 associated with the description tab 1208, including a summary of the asset 1221, and a matrix 1222 of the database tables in the asset 1220. The matrix 1222 includes information of the database tables 1224 in the asset 1220, and columns 1226 of the database tables 1224. Referring to FIG. 12*b*, the asset interface 1202 is shown with the properties tab 1210 selected. The data portion 1206 is updated to include information of the selected asset 1220 associated with the properties tab 1210, including properties 1230 of the asset 1220, such as a number of tables of the selected asset 1220. In some examples, the properties can include data indicating use cases of the asset 1220 (where the asset 1220 has been employed), data indicating the asset 1220 is a source for other queries or report asset. Referring to FIG. 12*c*, the asset interface 1202 is shown with the relational database query 1212 selected. The data portion 1206 is updated to include information of the selected asset 1220 associated with the relational database query 1212, including information pertaining to the database query of the selected asset 1220. Referring to FIG. 12*d*, the asset interface 1202 is shown with the diagram tab 1214 selected. The data portion 1206 is updated to include information of the selected asset 1220 associated with the diagram tab 1214, including a visual diagram 1240 depicting the database query of the selected asset 1120. The diagram 1240 can include depiction of the selected asset 1220 with respect to differing database tables.

Figure 13:
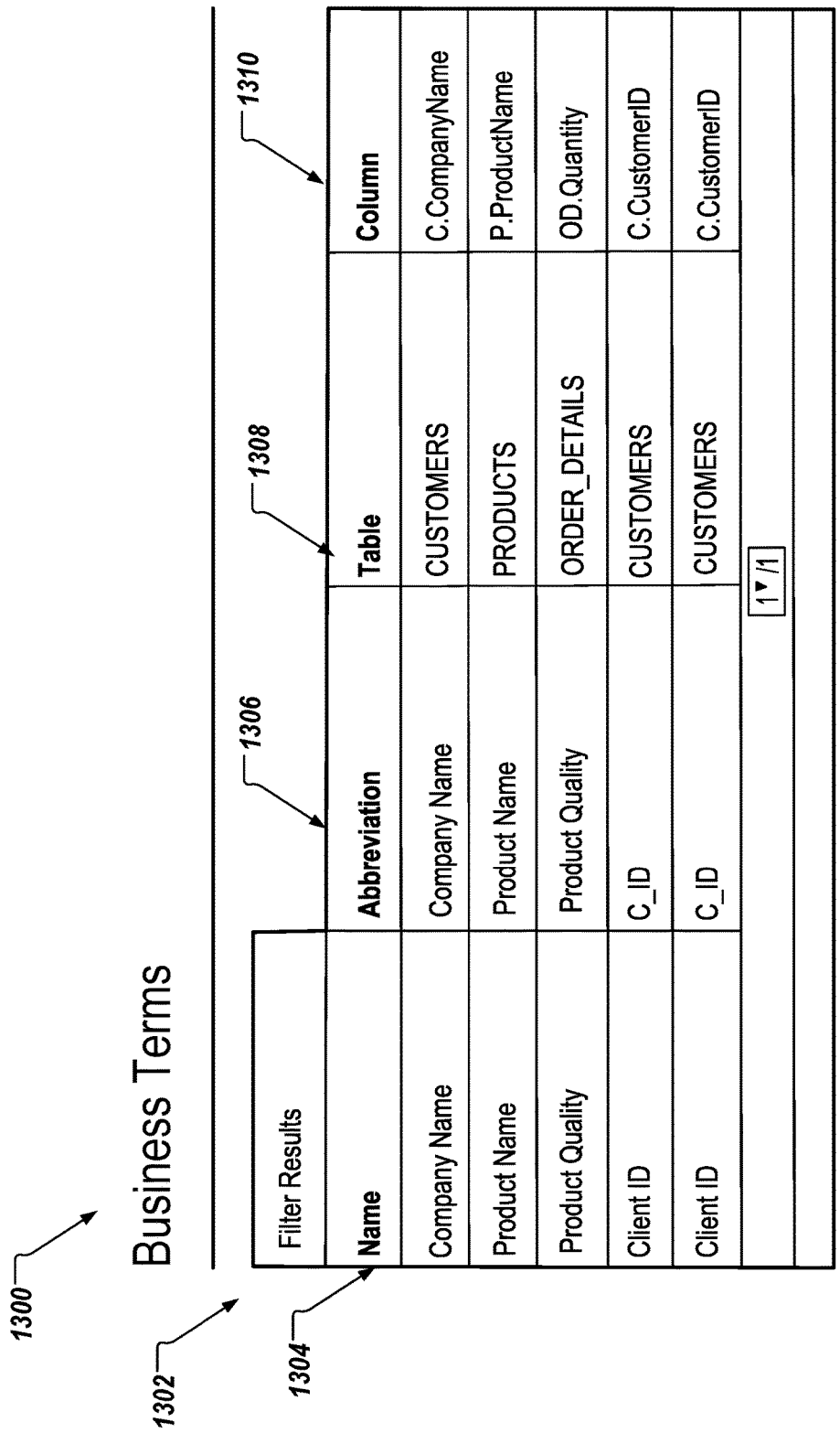
FIG. 13 depicts an enterprise term interface.

Referring to FIG. 13, the curator module 254 provides an enterprise term interface 1300. The enterprise term interface 1300 includes a matrix 1302 that identifies enterprise terms 1304, abbreviations 1306 for each respective enterprise term 1304, database tables 1308 that are associated with each respective enterprise term 1304, and columns 1310 that are associated with each respective enterprise term.

Figure 14:
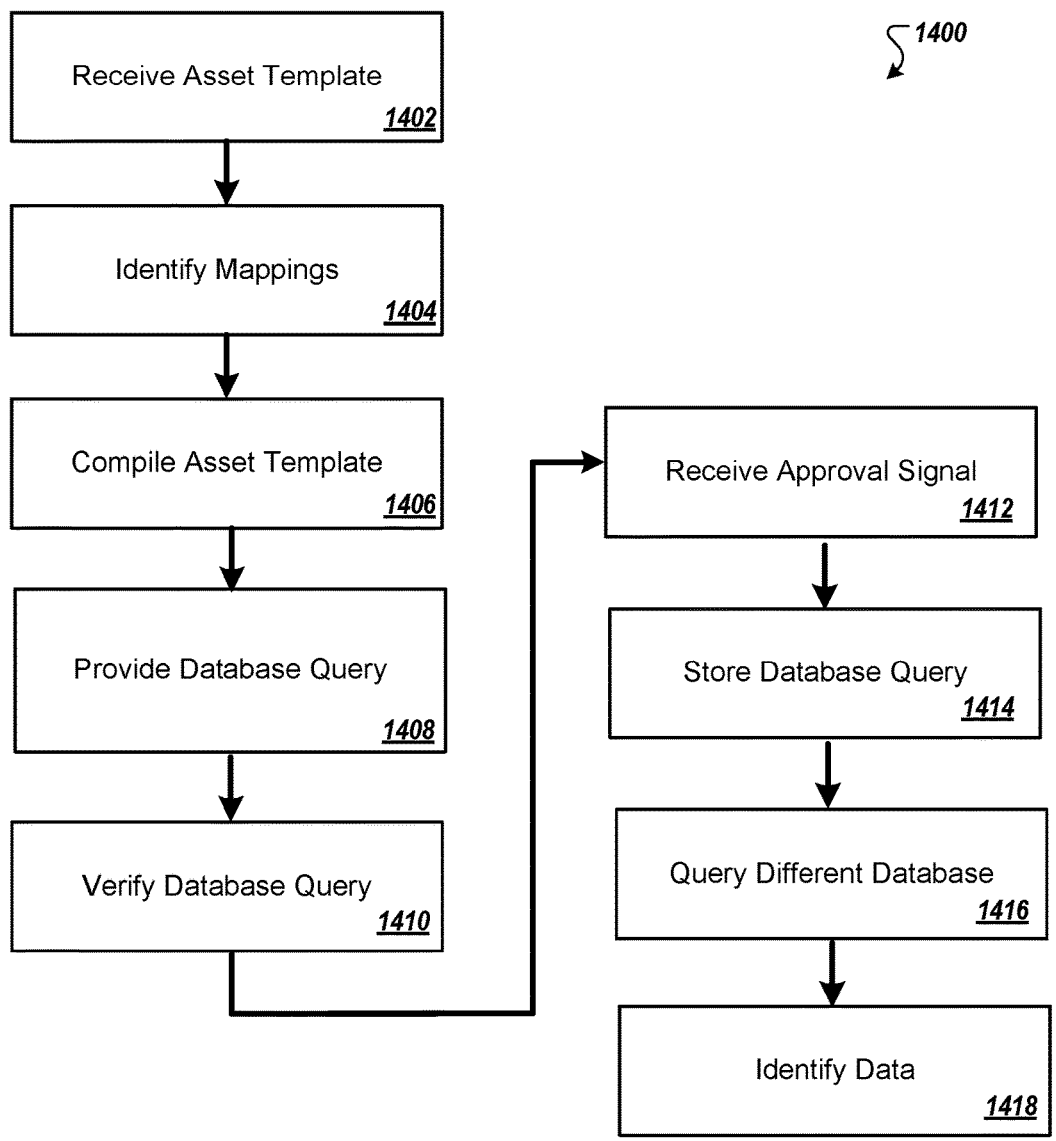
FIG. 14 depicts an example process for generation of database queries.

FIG. 14 depicts an example process 1400 that can be executed in accordance with implementations of the present disclosure. The example process 1400 can be implemented, for example, by the system 200 of FIG. 2. In some examples, the example process 1400 can be provided by one or more computer-executable programs executed using one or more computing devices.

An asset template is received (1402). In some examples, the asset template is associated with an enterprise context and enterprise terms. For example, the server system 202 can parse and tokenize the asset template 220 to identify the enterprise context and the enterprise terms of the asset template 220. Respective mappings of the enterprise terms to database tables are identified (1404). For example, the server system 202, e.g., the Curator module 254, identifies the enterprise terms, and when a match is found by the Curator module 254, the server system 202 then searches the database tables 222 based on the enterprise context of the asset template 220. The asset template is compiled based on the mappings to provide a database query (1406). For example, the server system 202 creates the database query 224 based on the mappings of enterprise terms to the database tables 222, for example, within the curator module 306. The database query is provided (1408). For example, exemplary implementations can provide the data base query for display. The database query is verified based on the providing, e.g., display (1410). For example, the database query 224 is provided to the user for verification of an accuracy of the database query 224. An approval signal associated with the database query is received in response to the verifying (1412). For example, the approval signal 226 is associated with the database query 224 indicating whether the database query 224 is accurate or inaccurate. The database query is stored (1414). For example, the database query 224 is stored in the database 206. A different database is queried utilizing the database query (1416). In response to the query, data stored by a different database is identified that is responsive to the database query (1418).

Figure 15:
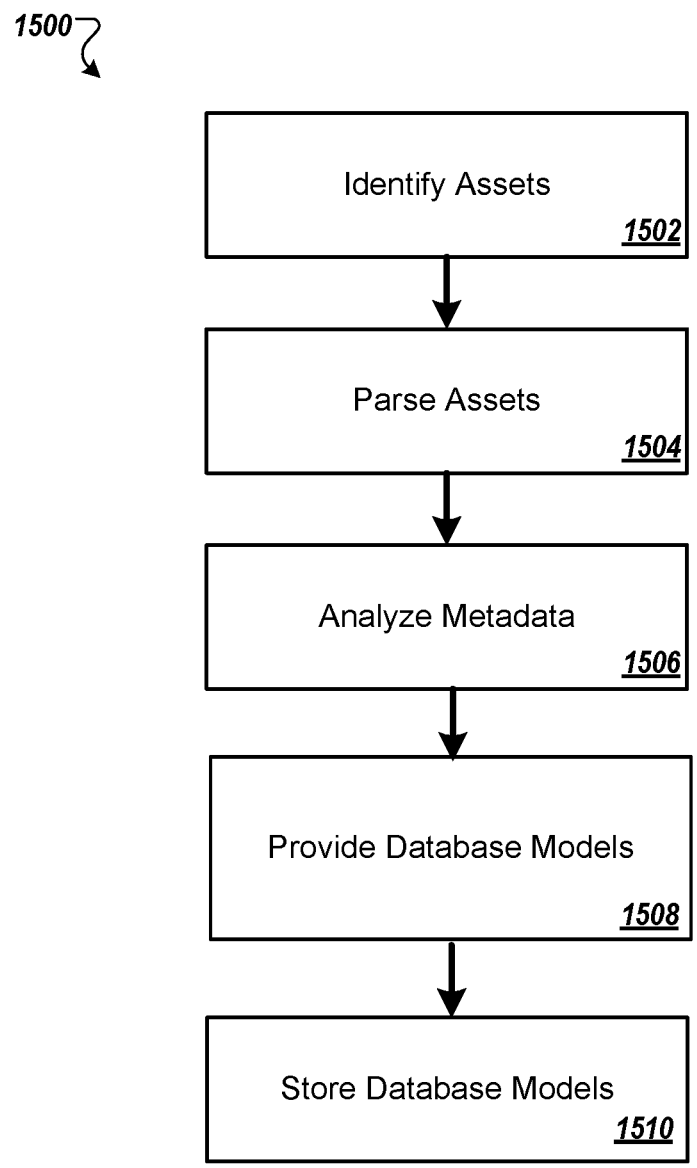
FIG. 15 depicts an example process for generation of a database.

FIG. 15 depicts an example process 1500 that can be executed in accordance with implementations of the present disclosure. The example process 1500 can be implemented, for example, by the system 1000 of FIG. 10. In some examples, the example process 1500 can be provided by one or more computer-executable programs executed using one or more computing devices.

A plurality of assets are identified (1502). In some examples, each asset is associated with a database query. For example, the server system 1002 identifies the assets 1020 stored by the database 1004. The assets are parsed to identify metadata associated with each asset (1504). For example, the server system 1002 parses the assets 1020 to identify metadata associated with each. The metadata is analyzed to identify enterprise terms (1506). For example, the server system 1002 analyzes the identified metadata to identify enterprise terms 1030. In response to the analyzing, database models are provided that store relationships between the assets and the metadata (1508). For example, the server system 1002, in response to analyzing the identified metadata 1022, provides data models 1050 that store relationships between the assets 1020. In some examples, the relationship include links between the assets and enterprise terms determined to be associated with the assets. The database models are stored (1510).

Software applications that integrate with systems 200, 1000 may integrate at their point of connection using dynamic-link library (DLL). The DLL provides key contracts and a helper class for sending of messages and receiving of responses (e.g., to and from the systems 200, 1000). In some examples, software applications that access systems 200, 1000 utilize a REST-based web service.

Once a message is provided to the integration module, e.g., Integration module 260, the integration module verifies the access key of the software application, and based on the verification, the integration module completes the action by accessing the systems 200, 1000. Such actions are stored in a historic table log. In some examples, the integration module can revoke access to any software application (e.g., in view of phishing attacks by the software application). In some examples, the integration module provides the following actions to software applications for interaction with data models/database tables of systems 200, 1000: i) create—creation of a new item in the data model; ii) read—obtain details of a data model item; iii) list—obtain a listing of data models; iv) update—modify a data model item; and v) delete—remove a data item model. Additionally, to facilitate such integration, the integration module can be in communication with data tables that are separate from the databases of systems 200, 1000. For example, such data tables can include: i) application access key data table—the key and permissions for each application; ii) configuration options data table—establishes the key that is utilized by the configuration of the integration module; iii) configuration value data table—establish the value of each key in the configuration of the integration module and iv) history data table—stores log of events that the application has requested.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a Web browser through which a user may interact with an implementation, or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for generating database queries, comprising:

receiving, at a server computer via a network, an asset template of asset templates, the asset template including both an enterprise context and one or more enterprise terms, wherein in a first enterprise context an enterprise term of the one or more enterprise terms corresponds to a single column in a first database of the first enterprise context and in a second enterprise context the enterprise term corresponds to two columns in a second database of the second enterprise context;

parsing and tokenizing, by the server computer, the asset template to identify metadata associated with the asset template;

expanding, by the server computer, the enterprise term into a formula, the formula depending on the two columns of database tables in the second database based on the enterprise context identified from the asset template corresponding to the second enterprise context, and the formula to include in a context-based term;

identifying, by the server computer, respective mappings of the context-based term that includes the formula that depends on the two columns in the second database to one or more database tables of the second database;

compiling, by the server computer and based on input from an application interface, the asset template based on the mappings to create a database query;
providing, by the server computer, the database query to a computing device for display, the displaying for verification of the database query;
verifying, by the server computer, the database query based on the displaying;
receiving, by the server computer, in response to the verifying, an approval signal associated with the database query;
storing, by the server computer, the database query in a memory, the storing based on the approval signal of the verifying;
creating an asset based on the database query, the creating an asset based on receiving the approval signal, the asset including searchable metadata for identifying the asset, and wherein the searchable metadata includes an identifier of a complexity of the asset;
querying, by the server computer, a third database utilizing the database query; and
in response to the querying, identifying, by the server computer and based on the searchable metadata and a resource location of the database query stored in a database model, data stored by the third database that is responsive to the database query.

2. The method of claim 1, wherein the database query is a relational database query.

3. The method of claim 2, wherein the relational database query is a Structure Query Language (SQL) query.

4. The method of claim 1, wherein the database query is a NoSQL query.

5. The method of claim 1, wherein the enterprise term is associated with one or more of a formula value, a scalar value, and a dynamic value.

6. A system comprising:
one or more processors and one or more storage devices storing instructions that are operable, when executed by the one or more processors, to cause the one or more processors to perform operations comprising:
receiving, at a server computer via a network, an asset template of asset templates, the asset template including both an enterprise context and one or more enterprise terms, wherein in a first enterprise context an enterprise term of the one or more enterprise terms corresponds to a single column in a first database of the first enterprise context and in a second enterprise context the enterprise term corresponds to two columns in a second database of the second enterprise context;
parsing and tokenizing, by the server computer, the asset template to identify metadata associated with the asset template;
expanding, by the server computer, the enterprise term into a formula, the formula depending on the two columns in the second database based on the enterprise context identified from the asset template corresponding to the second enterprise context, and the formula to include in a context-based term;
identifying, by the server computer, respective mappings of the context-based term that includes the formula that depends on the two columns in the second database to one or more database tables of the second database;
compiling, by the server computer and based on input from an application interface, the asset template based on the mappings to create a database query;
providing, by the server computer, the database query to a computing device for display, the displaying for verification of the database query;
verifying, by the server computer, the database query based on the displaying;
receiving, by the server computer, in response to the verifying, an approval signal associated with the database query;
storing, by the server computer, the database query in a memory, the storing based on the approval signal of the verifying;
creating an asset based on the database query, the creating an asset based on receiving the approval signal, the asset including searchable metadata for identifying the asset, and wherein the searchable metadata includes an identifier of a complexity of the asset;
querying, by the server computer, a third database utilizing the database query; and
in response to the querying, identifying, by the server computer and based on the searchable metadata and a resource location of the database query stored in a database model, data stored by the third database that is responsive to the database query.

7. The system of claim 6, the operations further comprising:
querying a different database utilizing the database query; and
in response to the querying, identifying data stored by the different database that is responsive to the database query.

8. The system of claim 6, wherein the database query is a relational database query.

9. The system of claim 8, wherein the relational database query is a Structure Query Language (SQL) query.

10. The system of claim 6, wherein the database query is a NoSQL query.

11. The system of claim 6, wherein the enterprise term is associated with one or more of a formula value, a scalar value, and a dynamic value.

12. A non-transitory computer-readable medium storing software comprising instructions executable by one or more computers which, upon such execution, cause the one or more computers to perform operations comprising:
receiving, at a server computer via a network, an asset template of asset templates, the asset template including both an enterprise context and one or more enterprise terms, wherein in a first enterprise context an enterprise term of the one or more enterprise terms corresponds to a single column in a first database of the first enterprise context and in a second enterprise context the enterprise term corresponds to two columns in a second database of the second enterprise context;
parsing and tokenizing, by the server computer, the asset template to identify metadata associated with the asset template;
expanding, by the server computer, the enterprise term into a formula, the formula depending on the two columns of database tables in the second database based on the enterprise context identified from the asset template corresponding to the second enterprise context, and the formula to include in a context-based term;
identifying, by the server computer, respective mappings of the context-based term that includes the formula that depends on the two columns in the second database to one or more database tables of the second database;

compiling, by the server computer and based on input from an application interface, the asset template based on the mappings to create a database query;

providing, by the server computer, the database query to a computing device for display, the displaying for verification of the database query;

verifying, by the server computer, the database query based on the displaying;

receiving, by the server computer, in response to the verifying, an approval signal associated with the database query;

storing, by the server computer, the database query in a memory, the storing based on the approval signal of the verifying;

creating an asset based on the database query, the creating an asset based on receiving the approval signal, the asset including searchable metadata for identifying the asset, and wherein the searchable metadata includes an identifier of a complexity of the asset;

querying, by the server computer, a third database utilizing the database query; and in response to the querying, identifying, by the server computer and based on the searchable metadata and a resource location of the database query stored in a database model, data stored by the third database that is responsive to the database query.

13. The computer-readable medium of claim 12, the operations further comprising:

querying a different database utilizing the database query; and in response to the querying, identifying data stored by the different database that is responsive to the database query.

14. The computer-readable medium of claim 12, wherein the database query is a relational database query.

15. The computer-readable medium of claim 14, wherein the relational database query is a Structure Query Language (SQL) query.

16. The computer-readable medium of claim 12, wherein the database query is a NoSQL query.

* * * * *